US009646410B2

(12) United States Patent
Collet Romea et al.

(10) Patent No.: US 9,646,410 B2
(45) Date of Patent: May 9, 2017

(54) MIXED THREE DIMENSIONAL SCENE RECONSTRUCTION FROM PLURAL SURFACE MODELS

(71) Applicant: Microsoft Technology Licensing, LLC, Redmond, WA (US)

(72) Inventors: Alvaro Collet Romea, Seattle, WA (US); Steve Sullivan, Clyde Hill, WA (US); Adam Kirk, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/788,722

(22) Filed: Jun. 30, 2015

(65) Prior Publication Data

US 2017/0004649 A1    Jan. 5, 2017

(51) Int. Cl.
| | |
|---|---|
| *G06T 15/20* | (2011.01) |
| *G06T 17/20* | (2006.01) |
| *G06K 9/00* | (2006.01) |
| *G06K 9/62* | (2006.01) |

(52) U.S. Cl.
CPC ........ *G06T 15/205* (2013.01); *G06K 9/00214* (2013.01); *G06T 17/20* (2013.01); *G06K 9/00208* (2013.01); *G06K 9/629* (2013.01); *G06K 9/6211* (2013.01); *G06T 2215/16* (2013.01)

(58) Field of Classification Search
CPC ....... G06T 2207/10028; G06T 2210/56; G06T 2200/08; G06T 7/0075; G06K 9/00201
See application file for complete search history.

(56) References Cited

U.S. PATENT DOCUMENTS

| | | | |
|---|---|---|---|
| 6,016,150 A | 1/2000 | Lengyel et al. | |
| 6,232,974 B1 | 5/2001 | Horvitz et al. | |
| 6,326,964 B1 | 12/2001 | Snyder et al. | |
| 6,809,731 B2 | 10/2004 | Muffler et al. | |

(Continued)

FOREIGN PATENT DOCUMENTS

| | | |
|---|---|---|
| CA | 2194834 C | 9/2001 |
| WO | 9844445 B1 | 3/1999 |
| WO | 2013174671 A1 | 11/2013 |

OTHER PUBLICATIONS

Akbarzadeh et al., Towards Urban 3D Reconstruction From Video, Proceedings of the Third International Symposium on 3D Data Processing, Visualization, and Transmission (3DPVT'06), 2006, 8 pages.*

(Continued)

*Primary Examiner* — Haixia Du
(74) *Attorney, Agent, or Firm* — Mark K. Young; Mayer & Williams PC

(57) ABSTRACT

A three-dimensional (3D) scene is computationally reconstructed using a combination of plural modeling techniques. Point clouds representing an object in the 3D scene are generated by different modeled techniques and each point is encoded with a confidence value which reflects a degree of accuracy in describing the surface of the object in the 3D scene based on strengths and weaknesses of each modeling technique. The point clouds are merged in which a point for each location on the object is selected according to the modeling technique that provides the highest confidence.

11 Claims, 7 Drawing Sheets

(56) References Cited

U.S. PATENT DOCUMENTS

| | | | |
|---|---|---|---|
| 7,174,050 B2 | 2/2007 | Balmelli et al. | |
| 7,583,275 B2 | 9/2009 | Neumann et al. | |
| 7,812,850 B1 | 10/2010 | Nelson | |
| 7,830,381 B2 | 11/2010 | Lundstrom et al. | |
| 8,587,594 B2 | 11/2013 | Mejdrich et al. | |
| 8,681,154 B1 | 3/2014 | Gardiner | |
| 2003/0123751 A1 | 7/2003 | Krishnamurthy et al. | |
| 2004/0221053 A1 | 11/2004 | Codella | |
| 2007/0103460 A1* | 5/2007 | Zhang | G06T 7/2033 345/419 |
| 2008/0196076 A1 | 8/2008 | Shatz | |
| 2010/0182406 A1 | 7/2010 | Benitez | |
| 2010/0226534 A1* | 9/2010 | Doria | G06K 9/6289 382/103 |
| 2011/0069224 A1 | 3/2011 | Gross | |
| 2012/0050481 A1 | 3/2012 | Chen et al. | |
| 2012/0056982 A1* | 3/2012 | Katz | H04N 13/025 348/43 |
| 2012/0221297 A1 | 8/2012 | Nanson et al. | |
| 2012/0313927 A1 | 12/2012 | Curington | |
| 2013/0106834 A1 | 5/2013 | Curington | |
| 2013/0271463 A1 | 10/2013 | Curington | |
| 2014/0002597 A1 | 1/2014 | Taguchi et al. | |
| 2014/0098090 A1 | 4/2014 | Schmidt | |
| 2014/0132604 A1 | 5/2014 | Bao et al. | |
| 2014/0184598 A1 | 7/2014 | Quilot et al. | |
| 2014/0184599 A1 | 7/2014 | Quilot et al. | |
| 2015/0178988 A1* | 6/2015 | Montserrat Mora | G06T 13/40 345/420 |

OTHER PUBLICATIONS

Shan, et al., "Occluding Contours for Multi-View Stereo", In Proceedings of Conference on Computer Vision and Pattern Recognition, Jun. 24, 2014, (8 pages total).

Cheung, et al.,"Visual Hull Alignment and Refinement across Time: A 3D Reconstruction Algorithm Combining Shape-From-Silhouette with Stereo", In Proceedings of IEEE Computer Society Conference on Computer Vision and Pattern Recognition, vol. 2, Jun. 18, 2003, (8 pages total).

Li, et al., "Combining Stereo and Visual Hull Information for On-line Reconstruction and Rendering of Dynamic Scenes", In Proceedings of IEEE Workshop on Multimedia Signal Processing, Dec. 9, 2002, (4 pages total).

Cremers, et al., "Multiview Stereo and Silhouette Consistency via Convex Functionals over Convex Domains", In Journal of IEEE Transactions on Pattern Analysis and Machine Intelligence, vol. 33, Issue 6, Jun. 1, 2011, (14 pages total).

Lin, et al., "3D Reconstruction by Combining Shape from Silhouette with Stereo", In Proceedings of 19th International Conference on Pattern Recognition, Dec. 8, 2008, (4 pages total).

Sinha, et al., "Multi-view Reconstruction using Photo-consistency and Exact Silhouette Constraints: A Maximum-Flow Formulation", In Proceedings of Tenth IEEE International Conference on Computer Vision, vol. 1, Oct. 17, 2005, (8 pages total).

Goesele, et al., "Multi-View Stereo Revisited", In Proceedings of IEEE Computer Society Conference on Computer Vision and Pattern Recognition, vol. 2, Jun. 17, 2006, (8 pages total).

Labatut, et al., "Efficient Multi-View Reconstruction of Large-Scale Scenes using Interest Points, Delaunay Triangulation and Graph Cuts", In Proceedings of IEEE 11th International Conference on Computer Vision, Oct. 14, 2007, (8 pages total).

Sinha, et al., "Multi-View Stereo via Graph Cuts on the Dual of an Adaptive Tetrahedral Mesh", In Proceedings of IEEE 11th International Conference on Computer Vision, Oct. 14, 2007, (8 pages total).

Bleyer, et al., "PatchMatch Stereo—Stereo Matching with Slanted Support Windows", In British Machine Vision Conference, Aug. 29, 2011, (2 pages total).

Furukawa, et al., "Carved Visual Hulls for Image-Based Modeling", In International Journal of Computer Vision, vol. 81, Issue 1, Jan. 2009, (15 pages total).

Furukawa, et al., "Accurate, Dense, and Robust Multiview Stereopsis", In IEEE Transactions on Pattern Analysis and Machine Intelligence, vol. 32, Issue 8, Aug. 2010, (8 pages total).

Esteban, et al., "Silhouette and Stereo Fusion for 3D Object Modeling", In Proceedings of Computer Vision and Image Understanding, vol. 96, Issue 3, Dec. 2004, (27 pages total).

Song, et al., Volumetric Stereo and Silhouette Fusion for Image-Based Modeling, In Journal of the Visual Computer, vol. 26, Issue 12, Dec. 1, 2010, (8 pages total).

Pass, et al., "Comparing Images Using Joint Histograms", ACM Journal of Multimedia Systems, vol. 7, No. 3, pp. 234-240 (1999) (15 pages total).

Grad Project: 3D Printing, Retrieved from :http://lloydramsay-gradproject.blogspot.com, Oct. 19, 2011; Retrieved on Jun. 17, 2015 (20 pages total).

Havemann, et al., "Progressive Combined B-reps—Multi-Resolution Meshes for Interactive Real-time Shape Design", In Proceedings of 16th International Conference in Central Europe on Computer Graphics, Visualization and Computer Vision, Feb. 4, 2008, (16 Pages total).

Boubekeur, et al., "Generic Adaptive Mesh Refinement", Published on: Dec. 12, 2008 Available at: http://http.developer.nvidia.com/GPUGems3/gpugems3_ch05.html (14 pages total).

Dyken, et al., "Semi-Uniform Adaptive Patch Tessellation", In Proceedings of Computer Graphics Forum, vol. 28, Issue 8, Dec. 2009, pp. 1-9 (9 pages total).

Zhang, et al., "An Efficient Method of Key-Frame Extraction Based on a Cluster Algorithm", In Journal of Human Kinetics, vol. 39, Dec. 18, 2013, pp. 5-13 (9 pages total).

Xiao, et al., "An Efficient Keyframe Extraction from Motion Capture Data", In Proceedings of 24th International Conference on Advances in Computer Graphics, Jun. 26, 2006, (2 Pages total).

Meyer, et al., "Particle-based Sampling and Meshing of Surfaces in Multimaterial Volumes", In Journal of IEEE Transactions on Visualization and Computer Graphics, vol. 14, Issue 6, Nov. 1, 2008, (8 pages total).

Zhou, et al., "Large Mesh Deformation Using the Volumetric Graph Laplacian", In Proceedings of ACM SIGGRAPH, vol. 24, Issue 3, Jul. 31, 2005, pp. 496-503 (8 pages total).

"Shape Uncertainty and Variability", Published on: Oct. 16, 2010 Available at: http://lgg.epfl.ch/research.php?p=7 (8 pages total).

"Deforming Surfaces and Using the Mesh Modifiers in 3ds Max", Retrieved on: Nov. 12, 2014 Available at: http://3dmaxhub.com/deforming-surfaces-and-using-the-mesh-modifiers-in-3ds-max/ (24 pages total).

Kazhdan, et al., "Poisson Surface Reconstruction", In Proceedings of Eurographics Symposium on Geometry Processing, Jun. 2006, (10 pages total).

Li, et al., "Robust Single-View Geometry and Motion Reconstruction", In Journal of ACM Transactions on Graphics, vol. 28, Issue 5, Dec. 2009, (10 pages).

Brown, et al., "Visual Attention-based Polygon Level of Detail Management", In Proceedings of the 1st International Conference on Computer Graphics and Interactive Techniques in Australasia and South East Asia, Feb. 2003, (8 pages total).

Bible, John, "Attentional Flow Networks: A Real-Time Adaptive Display Technique", In Thesis of Master of Science, Aug. 18, 2000, (175 pages total).

Brown, et al., "Visual Importance-biased Image Synthesis Animation", In Proceedings of the 1st International Conference on Computer Graphics and Interactive Techniques in Australasia and South East Asia, Feb. 2003, (9 pages total).

Lengyel, et al., "Rendering with Coherent Layers", In Proceedings of the 24th Annual Conference on Computer Graphics and Interactive Techniques, Aug. 1997, (10 pages total).

"Microsoft Research Face SDK Beta", Retrieved on: Nov. 19, 2014, Available at: http://research.microsoft.com/en-us/projects/facesdk/ (2 pages total).

(56) References Cited

OTHER PUBLICATIONS

"Skeletal Tracking", Retrieved on: Nov. 19, 2014, Available at: http://msdn.microsoft.com/en-us/library/hh973074.aspx (3 pages total).
Hoppe, Hugues, "New Quadric Metric for Simplifying Meshes with Appearance Attributes", In Proceedings of the 10th IEEE Visualization Conference, Oct. 1999, (8 pages total).
"Using UVAtlas (Direct3D 9)", Retrieved on: Nov. 19, 2014, Available at: http://msdn.microsoft.com/en-us/library/windows/desktop/bb206321(v=vs.85).aspx (5 pages total).
Catmull, et al., "Recursively Generated B-Spline Surfaces on Arbitrary Topological Meshes", In Proceedings of Computer-Aided Design, vol. 10, Issue 6, Nov. 1978, pp. 350-355. (6 pages total).
Chen, et al., "Scalable Real-Time Volumetric Surface Reconstruction", In Proceedings of ACM Transactions on Graphics, vol. 32, No. 4, Jul. 2013, (2 pages total).
Alexa, et al., "Point Set Surfaces", In Proceedings of the conference on Visualization, Oct. 21, 2001, (8 pages total).
Clark, James. H., "Hierarchical Geometric Models for Visible Surface Algorithms", In Proceedings of Communications of the ACM, vol. 19, Issue 10, Oct. 1976, (8 pages total).
Williams, Lance, "Pyramidal Parametrics", In Proceedings of ACM SIGGRAPH Computer Graphics, vol. 17, Issue 3, Jul. 1983, (11 pages total).
Nießner, et al., "Feature-Adaptive GPU Rendering of Catmull-Clark Subdivision Surfaces", In Journal ACM Transactions on Graphics, vol. 31, Issue 1, Jan. 2012, (11 pages total).
"International Search Report and Written Opinion Issued in PCT Application No. PCT/US2016/037459", Mailed Date: Sep. 7, 2016, (13 Pages total).
Merrell, et al., "Real-Time Visibility Based Fusion of Death Maps", In Proceedings of the IEEE 11th International Conference on Computer Vision, Oct. 14, 2007, (8 Pages total).
Pauly, et al., "Uncertainty and Variability in Point Cloud Surface Data", In the Proceeding of Eurographics Symposium on Point-Based Graphics, Jan. 2004, (8 Pages total).
Wheeler, et al., "Consensus Surfaces for Modeling 3D Objects from Multiple Range Images", In the International conference on Computer Vision, Jan. 1, 1998, pp. 917-924. (8 Pages total).
Hornung, et al., "Robust Reconstruction of Watertight 3D Models from Non-Uniformly Sampled Point Clouds Without Normal Information", In the Proceeding of Eurographics Symposium of Geometry Processing, Jan. 2006, (10 Pages total).
Schnabel, et al., "Efficient RANSAC for Point-Cloud Shape Detection", In the Forum of Computer Graphics, vol. 26, Issue 2, Jun. 1, 2007, pp. 214-226 (13 Pages total).
Gu, Lijun, and Gary W. Meyer. "Perceptually guided polygon reduction." IEEE Transactions on Visualization and Computer Graphics 14.5 (2008): 1015-1029. (15 pages total).
"International Search Report and Written Opinion Issued in PCT Application No. PCT/US2016/042174", Mailed Date: Oct. 21, 2016, (12 Pages total).
Zeineb Abderrahim, Hanen Jeder, Mohamed Salim Bouhlel: "Interactive multiresolution visualization of 3D mesh", International Journal of Computer Applications, vol. 67, No. 14, Apr. 2013, pp. 1-7, (7 pages total).
Heckbert, P.S., et al: "Multiresolution modeling for fast rendering", Proceedings. Graphics Interface 94, May 18, 1994, pp. 43-50, Alberta, Canada (8 pages total).
Javier Lluch et al: "Multiresolution 3D Rendering on Mobile Devices", Jan. 1, 2006, Computational Science—ICCS 2006 Lecture Notes in Computer Science; LNCS, Springer, Berlin, DE, pp. 287-294 (8 pages total).
Rodrigo Barni et al: "Salient Clustering for View-dependent Multiresolution Rendering", Computer Graphics and Image Processing (SIBGRAPI), 2009 XXII Brazilian Symposium on, IEEE, Piscataway, NJ, USA, Oct. 11, 2009, pp. 56-63, (8 pages total).
"International Search Report and Written Opinion Issued in PCT Application No. PCT/US2016/039474", Mailed Date: Oct. 27, 2016, (13 Pages total).
Nizam Anuar et al., "Extracting Animated Meshes with Adaptive Motion Estimation", Nov. 16, 2004, Stanford, USA, Retrieved from the Internet: https://pdfs.semanticscholar.org/1f96/7ce471cdfb859cb6ed8207d8af25f968c015.pdf?ga=I.252482382.695399578.1476716265—[retrieved on Oct. 19, 2016] (9 pages total).
Cedric Cagniart, Edmond Boyer, Slobodan llic. Iterative Deformable Surface 'Tracking in Multi-View Setups. 3DPVT 2010—5th International Symposium on 3D Data Processing, Visualization and 'Transmission, May 2010, Paris, France. 2010. <inria-00568910> (9 pages total).
Schwarz, Michael, and Marc Stamminger. "Fast GPU-based Adaptive Tessellation with CUDA." Computer Graphics Forum 28.2 (2009): 365-374. (10 pages total).
Bernard, Pierre, Aaron Hertzmann, and Michael Kass. "Computing Smooth Surface Contours with Accurate Topology." TOG ACM Trans. Graph. ACM Transactions on Graphics 33.2 (2014): 1-21. (20 pages total).
Prada, Fabian, Misha Kazhdan, Ming Chuang, Alvaro Collet and Hugues Hoppe. "Motion Graphs for Unstructured Textured Meshes." ACM Trans. Graphics (SIGGRAPH), 35(4), (2016): Article No. 108, (14 pages total).
Anuar, et al. "Extracting Animated Meshes with Adaptive Motion Estimation", Retrieved From <<https://pdfs.semanticscholar.org/1f96/7ce471cdfb859cb6ed8207d8af25f968c015.pdf>>, Nov. 16, 2004, 9 Pages.
Cagniart, et al. "Iterative Deformable Surface Tracking in Multi-View Setups", In the proceedings of 3DPVT in International Symposium on 3D Data Processing, Visualization and Transmission, May 17, 2010, 9 Pages.
"International Search Report and Written Opinion Issued in PCT Application No. PCT/US2016/039474", Mailed Date: Oct. 27, 2016, 12 Pages.
Abderrahim, et al., "Interactive Multiresolution Visualization of 3D Mesh", In the Proceedings of the International Journal of Computer Applications, vol. 67, Issue 14, Apr. 2013, (7 Pages total).
Barni, et al., "Salient Clustering for View-dependent Multiresolution Rendering", In 2009 XXII Brazilian Symposium on computer Graphics and Image Processing, Oct. 11, 2009, pp. 56-63 (8 pages total).
Heckbert, et al., "Multiresolution Modeling for Fast Rendering", In the Proceedings of Graphics Interface, May 18, 1994, pp. 43-50 (8 pages total).
Lluch, et al., "Multiresolution 3D Rendering on Mobile Devices", In the Proceedings of Computational Science—ICCS 2006, vol. 3992 of the series Lecture Notes in Computer Science, Jan. 1, 2006, pp. 287-294 (8 pages total).
"International Search Report and Written Opinion Issued in PCT Application No. PCT/US2016/042174", Mailed Date: Oct. 21, 2016, (11 Pages total).
"Second Written Opinion Issued in PCT Application No. PCT/US2016/042174", Mailed Date: Jan. 16, 2017, (6 Pages total).

\* cited by examiner

MIXED THREE DIMENSIONAL SCENE RECONSTRUCTION FROM PLURAL SURFACE MODELS

BACKGROUND

Conventional techniques for the computational reconstruction of a three-dimensional (3D) scene from input images or photographs include Multiview Stereo (MVS), and Shape from Silhouette (SfS, also called "visual hull"), among others. While providing satisfactory results in some conditions, such methods each have certain weaknesses, and inaccuracies which emerge under particular conditions of viewpoint, material, and lighting in the input images.

SUMMARY

A three-dimensional (3D) scene is computationally reconstructed using a combination of plural modeling techniques. Point clouds representing an object in the 3D scene are generated by different modeled techniques and each point is encoded with a confidence value which reflects a degree of accuracy in describing the surface of the object in the 3D scene based on strengths and weaknesses of each modeling technique. The point clouds are merged in which a point for each location on the object is selected according to the modeling technique that provides the highest confidence.

In various illustrative examples, MVS techniques may be well adapted for objects having a high degree of texturedness. Accordingly, the average texturedness at a given location can be a proxy for confidence in that point location. Conversely, SfS techniques may be well adapted for objects that are small in a local dimension such as long thin objects and objects that have smooth and/or specular surface features. Where the object dimension is small, the corresponding visual hull volume is small, and therefore there may be greater confidence in the location of the corresponding mesh point. A descriptive dimension of the visual hull volume at a location on the object may thus be a proxy for the confidence of the SfS point at that location. Comparing the two or more confidences, once normalized with one another, and selecting the point with a higher confidence yields a merged point cloud that has enhanced accuracy.

Such enhancement may enable computing systems that rely on 3D models to have improved performance, for example, in machine vision, robotic, design gaming, and other applications. The use of more accurate 3D models in such systems can reduce errors and can improve processing speeds and the accuracy of downstream processes in some implementations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like references indicate like elements in the drawings. Elements are not drawn to scale unless otherwise indicated.

DETAILED DESCRIPTION

Prior solutions to overcome weaknesses in any particular modeling technique include Hernandez, C., & Schmitt, F. (Silhouette and Stereo Fusion for 3D Object Modeling. *Computer Vision and Image Understanding*, 96(3), 367-392 (2004)) which incorporates SfS into a 3D reconstruction using the visual hull as a starting point to complement other sources of information. Furukawa, Y., & Ponce, J. (Carved Visual Hulls for Image-Based Modeling. *International Journal of Computer Vision*, 81(1), 53-67. doi:10.1007/s11263-008-0134-8 (2009)) incorporates SfS as the only source to generate the 3D reconstruction. Song, P., Wu, X., & Wang, M. Y. (Volumetric Stereo and Silhouette Fusion for Image-Based Modeling. *The Visual Computer*, 26(12), 1435-1450. doi:10.1007/s00371-010-0429-y (2010)) proposes to combine SfS into point-cloud based methods by sampling the visual hull by creating an initial 3D point cloud from MVS, and then filling in areas with low point density using the sampled visual hull.

In accordance with present mixed 3D scene reconstruction from plural surface models, the results of several modeling techniques such as MVS and SfS are adaptively combined to generate a dense point cloud, which can be meshed using various meshing techniques such as Poisson Surface Reconstruction. This mixed 3D scene reconstruction differs from (Song et al., 2010) at least in that the source of each point in a point cloud, whether MVS or SfS, is chosen depending on computed confidences for each source and point. In addition, the subsequent MVS optimization is performed depending on these confidences. That is, points with high confidence are not moved and/or optimized at all, and points with low confidence are permitted to be moved significantly.

One advantage of this adaptive combination is that it enables utilization of the best of both techniques. The MVS technique may often be a more performant solution overall, but there are certain objects and/or geometries in which SfS provides a more optimal solution. Such objects and/or geometries include, for example, untextured objects having highly specular reflections, and thin objects. One particular example of an object having both of these characteristics is the shaft of a golf club.

Figure 1:
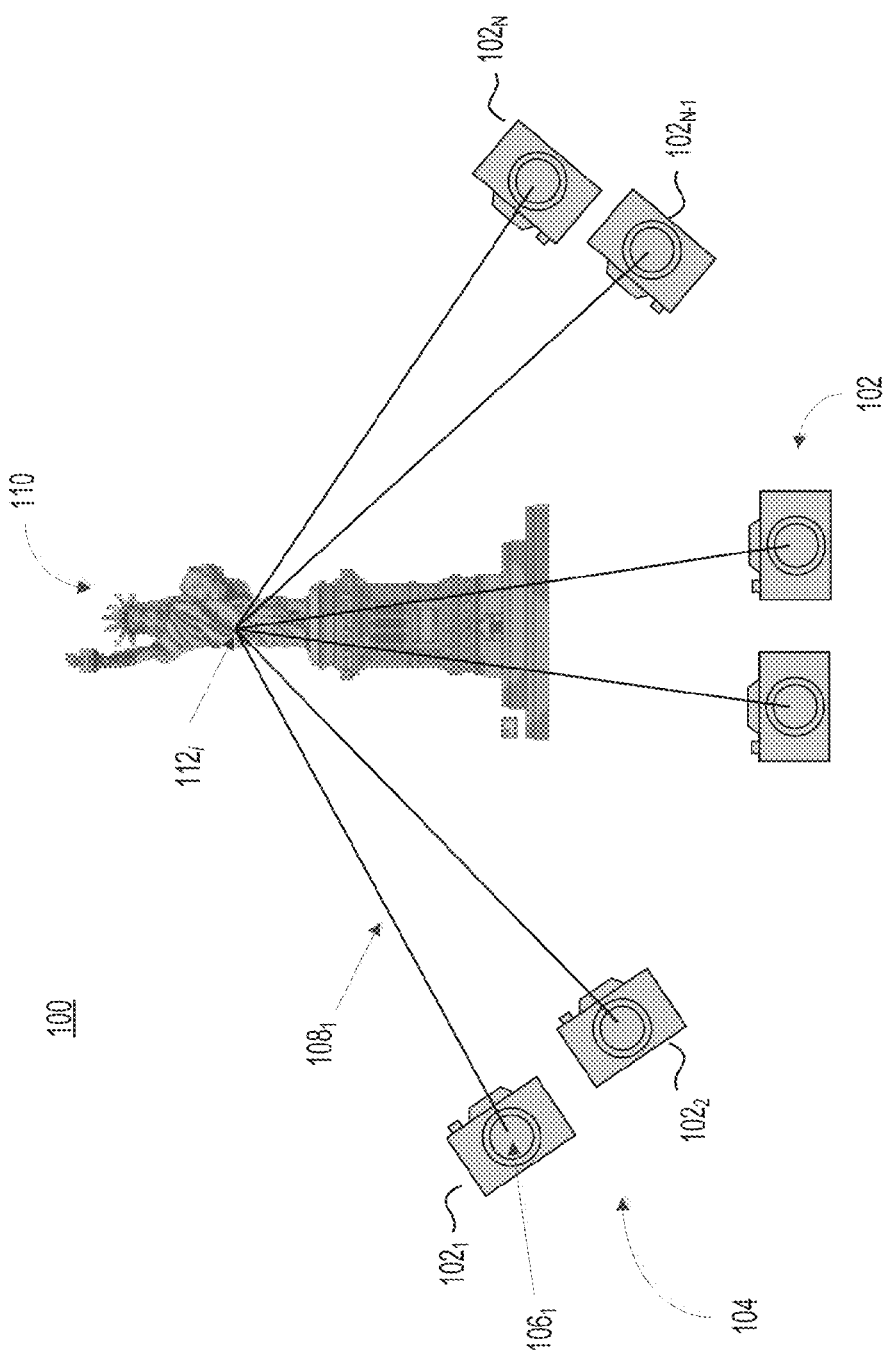
FIG. 1 illustrates schematically a system for mixed three dimensional (3D) scene reconstruction from plural surface models according to an exemplary embodiment of the presently disclosed principles.

Referring now to FIG. 1, illustrated schematically is a system 100 that operates to image a 3D object 110 for computational modeling. For the purpose of illustration only, FIG. 1 represents object 110 as an icon corresponding to the Statute of Liberty monument in the United States. Other representations herein of the object 110 are also of the Statue of Liberty, not necessarily the icon. The system 100 includes an arrangement having a number N of calibrated image capture devices, including without limitation digital cameras $102_1$ through $102_N$, more generally 102 or specifically $102_i$, organized as N/2 pairs 104 of cameras 102. Each camera 102 of a given pair 104 is operative to produce either or both RGB or IR image data of the object 110. At least one camera 102 of each pair 104 is further operative to produce a silhouette image of the object 110. It should be noted here that pairs 104 are formed somewhat arbitrarily, based upon the ability to combine the images from the two cameras 102 making up any given pair 104 in an MVS technique, as described further below. Accordingly, it may be understood that any camera 102 may be part of more than one pair 104.

The cameras 102 are modeled as pinhole cameras, such that all light of an image taken passes through an iris or the like, the center of which is termed the Point of View (POV), generally 106 or more particularly $106_1$ through $106_N$, specifically $106_i$. A ray, generally 108 or more particularly $108_1$ through $108_N$, specifically $108_i$ can be considered to connect the POV 106 of each camera 102 with the object 110 generally, or more specifically a particular point 111 on the object 110. The cameras 102 can be made to supply data to one or more computing devices 2000, such as those shown in FIG. 4 and described in the accompanying text, for further computation as described herein.

Figure 2:
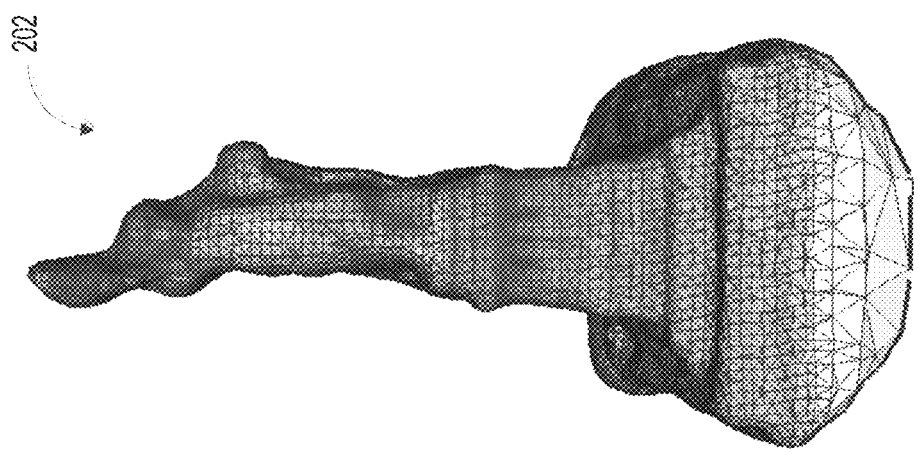
FIG. 2 depicts an exemplary wire mesh reconstruction of an object to be modeled.

An object may be modeled computationally by locating points on the surface of an object, termed a point cloud, and connecting adjacent points in the point cloud with lines or edges. The combination of points and edges is referred to as a wire mesh. Planar surfaces enclosed by edges are termed faces, and faces may be colored, shaded, and/or have an image texture applied thereto to represent the surface of the object. An exemplary wire mesh 202, including shading, representing object 110 is depicted in FIG. 2.

Figure 3:
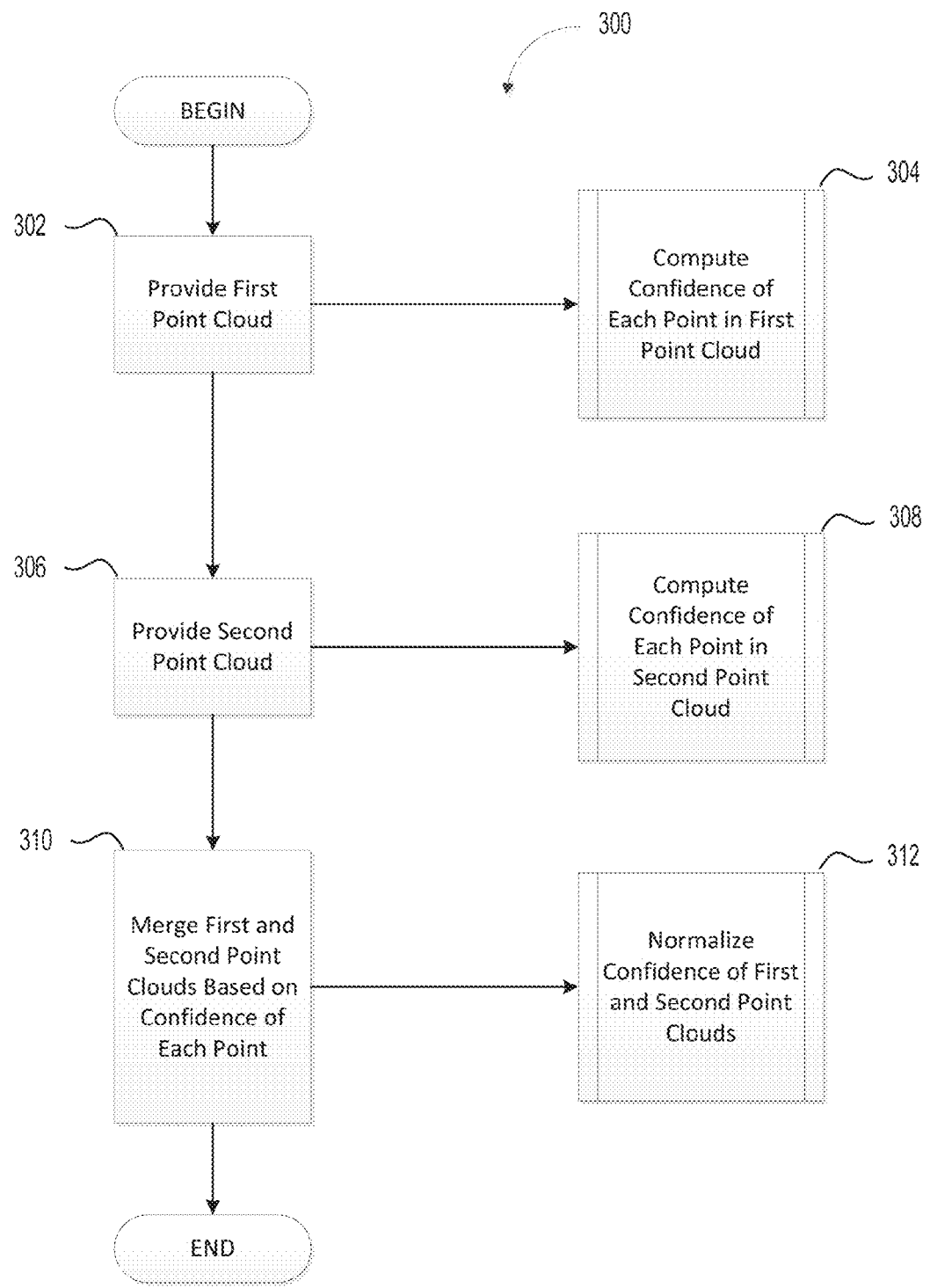
FIG. 3 is a flowchart of an illustrative method for reconstructing a mixed 3D scene from plural surface models.

FIG. 3 is flowchart of an illustrative method 300 for performing mixed 3D scene reconstruction from plural surface models. Initially, a first point cloud representing the object 110 is provided, in step 302 and a second point cloud representing the object 110 is also provided, in step 306. For example, image data from the cameras 102 of each pair 104 is taken, two separate point clouds representing points on the surface of the object 110 are computed according to separate techniques having different strengths and weakness with respect to the accuracy of their modeling. A first point cloud, called PCST, is computed using an MVS technique from each one of the N/2 pairs 104 of cameras 102, by comparing differences between image data from each camera 102 of the pair 104.

One illustrative example of computing the PCST is described by Bleyer, M., Rhemann, C., & Rother, C., Patchmatch Stereo—Stereo Matching with Slanted Support Windows, In British Machine Vision Conference (2011) and styled "Patch Match," in which depth maps are computed using stereo-based image data from camera pairs 104. Next, the depth maps are projected into a point cloud in some common coordinate system. Alternative reconstruction techniques such as other stereo methods, range finders, or time-of-flight technologies can also be used instead of the specific method described above, as long as it is possible to compute a confidence from each measurement. For the rest of this document, the term "stereo-based" is used generally to exemplify any specific instance of these techniques.

Additionally, a second point cloud is computed according to a second technique, in step 306. The second point cloud, called PCSL, is generated from the image data of at least one of the cameras 102 of the same pair 104 described above with respect to the first point cloud PCST. Point cloud PCSL is generated using a silhouette-based technique by first computing the visual hull, for example and without limitation in a visibility octree. The visibility octree is then sampled as described in (Song et al., 2010) to arrive at the elements of the point cloud PCSL.

For each point in each of the first and second point clouds PCST and PCSL, a confidence term is computed, in steps 304 and 308, respectively. The confidence term refers to a level (i.e., degree) of confidence that any given point in the respective point cloud accurately describes the surface of the object 110.

Confidence for the elements of point cloud PCST is calculated, in step 304, in which the confidence of any point P is based on the texturedness of the patches that originated that point P. According to a definition from "Comparing Images Using Joint Histograms", Greg Pass and Ramin Zabih ACM Journal of Multimedia Systems, vol. 7, no. 3 pages 234-240 (1999), texturedness at a given pixel may be understood to be related to the number of neighboring pixels whose intensities differ by more than a fixed value. A highly textured surface will typically have a higher degree of localized variation, and thus a high measure of texturedness. Smooth, uniform surfaces will typically have low localized variation, and thus low texturedness. In particular, the average of the intensity gradients of image patches in the images can be used as an approximate measure of texturedness. This approximation has the advantage of being both reasonably accurate and relatively simple and quick to calculate in a runtime environment.

The confidence weight of a point in PCST is determined, in step 304, based upon the texturedness of the image at point P. The expression $W_{p^i}$ represents an image patch surrounding point P in image i. A proper estimation of the confidence weight for points in the stereo point cloud PCST, denoted as $w_P^{st}$, may be used in some implementations. In depth estimation, patches with texture, i.e., those with large and abrupt localized variations in image intensity, also considered as having a high value of texturedness, produce more accurate solutions than untextured patches, i.e., those having low value of texturedness, including mostly constant image intensity. Therefore, a measure of patch texturedness is related to the confidence weight in PCST. In one exemplary implementation, the average magnitude of horizontal and vertical derivatives of each pixel is computed for the patch in question, expressed as $$G(W_{p^i})$$

The final confidence weight $w_P^{st}$ for a given 3D point in PCST is the average of $G(W_{p^i})$ for all images in the visibility set V(P).

In step 308, the confidence of point P is based on the length of the visible portion of the ray 108 passing from the POV 106 to point P. That is, the ray 108 with respect to point P intersects the visual hull for some length, termed $l_P$. The shorter the length $l_P$ of that straight segment of the ray 108 within the hull volume, the more similar the visual hull is to the true volume. In the limit case, the visual hull and the true volume are equivalent. Therefore, a measure of confidence of a silhouette point is inverse to the length of the ray 108 at point P.

The visual hull volume may be computed through carving out any data not considered part of the foreground object in the image mask. In the case of an infinite number of images and a convex object, the visual hull volume is exactly equivalent to the true object volume. In practice, however, the number of images is limited, and the object may have concavities, so that the true object volume is enclosed within the visual hull, but does not necessarily coincide with it. For any point P in PCSL, a ray 108 from the point of view 106 of the camera 102 capturing the image and going through the silhouette pixel P has a length $l_P$ where that ray intersects with the silhouette volume. There exists one point along $l_P$ at which the ray touches the true exterior surface of the volume. Therefore, the longer that length $l_P$, the higher the uncertainty about that point. The confidence weight, expressed as for 3D point P, is considered to be the inverse length $l_P$ of the visible portion of the ray going through the silhouette pixel to which P projects, i.e.

$$w_P^{vis} = \frac{1}{l_P}.$$

It may also be possible to propagate weights in the mask (for example, coming from an alpha matte) into these confidence weights. For example, a boundary pixel in the silhouette mask with a certain weight would contribute to the final weight by multiplying the confidence weights $w_P^{vis}$ and/or $w_P^{st}$.

Accordingly, PCST and PCSL are two initial point clouds, with each point in the respective clouds annotated with a confidence weight. The two point clouds may be merged, in step 310, into a single point cloud including reference to the respective confidence of each point. The two point clouds may serve as the basis for an MVS technique to determine the position of a point on the object 110, one example of the MVS technique having been described by Furukawa & Ponce, (2010). That is, the MVS technique can be applied to the combination of PCST and PCSL to produce a single optimized point cloud.

In MVS, each point may be optimized by comparing patches around the projections of a 3D point P in the set of images in which P is visible (called V(P), the visibility set of P). In order to optimize a point, the following items must be defined for each point:

The visibility set V(P): the set of images in which P is visible;

A reference image $l_{ref}$: the image in which the surface where P is embedded that has the smallest skew (i.e., most fronto-parallel image), comparing a ray connecting the camera point of view of the image I with a surface normal vector N at P;

A starting point $P_o$;

The range of optimization: how far (and in which directions) a point is permitted to move; and The step size ($\epsilon$): how easy/hard it is to move a point from its current position.

Computation of V(P), the reference images $I_{ref}$ and starting points $P_o$ include converting the point clouds PCST and PCSL to depth maps. A depth map may include a two-dimensional ("2D") pixel area encompassing the respective point clouds, where each pixel in the 2D pixel area may represent a depth value, such as a distance in, for example, centimeters, millimeters, or the like, of a point in either point cloud from the point of view of the image. In particular, both point clouds are projected into every image to compute a PCST depth map and a PCSL depth map. If multiple points fall in a single pixel, the concurrent points are divided according to clusters of their respective neighboring points. The point belonging to the cluster of points which is closest to the point of view of the image is retained. The farther point, being hidden, is discarded for the purposes of the depth map. The final 3D point chosen for each depth map is the point with highest confidence in the closest cluster. Then both depth maps for PCST and PCSL are merged by choosing, for each pixel, the 3D point with highest confidence value. The result can be a single merged point cloud, termed PCM.

For each surviving 3D point of PCM which is visible in at least two images, the following parameters are defined:

The visibility set V(P): the set of images in which the 3D point P is present in the depth maps;

The reference image $l_{ref}$: the image with smallest angle between the point normal and the vector joining the image center and point P;

The starting point $P_o$: the 3D position of point P;

The range of optimization: each point is optimized along the ray going through the center of the reference camera and the pixel in which P is projected in the reference camera—the distance any point can be moved is limited by the visual hull; i.e., no point can move outside the visual hull;

The step size ($\epsilon$): this variable is constrained to vary inversely with the point confidence, i.e., points with very high confidence move little if at all, while points with very low confidence can move farther and/or very easily.

It may be assumed that the starting points $P_o$ are sufficiently close to the global optima. Therefore, using a gradient descent with all the constraints above, each 3D point is optimized against all cameras in its visibility set, as described in more detail below. After such optimization, the resulting 3D point cloud is ready for meshing, using for example, a Poisson Surface Reconstruction.

When comparing confidences, the confidence weights $w_P^{st}$ and $w_P^{vis}$ are normalized with one another, step 312, before they can be compared. In particular, a proper normalization constant $\alpha$ is desired in order to ascertain whether $w_P^{st} - \alpha w_P^{vis} > 0$, in which case the stereo point is chosen if the expression is true, while the silhouette point is chosen if the expression is false.

In an illustrative example, a training procedure is used to determine an optimal normalization constant $\alpha$. Multiple cylinders of increasing diameter and varying texture are each labeled as "silhouette preferred" or "stereo preferred". Image data of these multiple cylinders are input into a binary classifier, for example and without limitation, a support vector machine (SVM). In the case of more than two image sources, the classification would have to be performed with a multiclass classifier, for example and without limitation, a multiclass SVM. In some implementations, the PCSL points may be selected when the ray length $l_P$ is for example, smaller than 2 cm. Values of $l_P$ larger than 5-6 cm, for example, can result in PCST points being selected in most cases. In the intermediate range in which $l_P$ is between about 2 cm and about 5-6 cm, a selected points may depend on the value of the stereo weight. These results are limited to the specific dimensions for all objects, but are scalable with the size of the object 110, or the training cylinders.

A basic description of an illustrative MVS optimization is now presented. Note that this is only one example, and that other alternative approaches for MVS optimization may be used depending on the needs of a particular implementation.

The expression $W_{p^i}$ refers to an image patch surrounding point p in image i. Consider the patches $W_{p^i}$ and $W_{p^j}$ around point p in images i and j. The patches $W_{p^i}$ and $W_{p^j}$ must be warped according to a planar homography, so that both patches correspond to the same physical area. After the patches are warped, the normalized cross-correlation (NCC) score is given by $$NCC(W_{p^i}, W_{p^j}) = \frac{1}{n} \sum_{x,y \in W} \frac{(W_{p^i}(x,y) - \overline{W_{p^i}})(W_{p^j}(x,y) - \overline{W_{p^j}})}{\sigma_{W_{p^i}} \sigma_{W_{p^j}}}$$

That is, the NCC is computed as the pixel-wise comparisons of both patches after subtracting their respective means ($\overline{W_{p^i}}$, $\overline{W_{p^j}}$), and variances ($\sigma_{w_{p^i}}$, $\sigma_{w_{p^j}}$). To compute a multi-view NCC score (MVNCC), the NCC scores between each image in the visibility set V(P) of point p are weighted against its reference image $I_{ref}$. The MVNCC score depends on the reference image $I_{ref}$ and on a reference plane $\pi_{ref}$. In particular, let $W_{p^i}(\pi_{ref})$ be a patch centered at point p in image i warped according to plane $\pi_{ref}$. Then, the MVNCC score is $$MVNCC(V(P)) = \sum_{p^i \in V^{IR}(P)} w_{p^i}^{si} NCC(W_{p^i}(\pi_{ref}), W_{p_{ref}}(\pi_{ref}))$$

To optimize the MVNCC score, a gradient descent may be used, based on the initial presumption that the score is sufficiently close to the global minimum for such a technique to be effective. Each point may be optimized along the ray 108 going through the point of view 106 of the reference camera 102 and the pixel in which P is projected in the reference camera. The distance a point can move is constrained by the visual hull, i.e., no points can move outside the visual hull. To determine the learning rate, or step size $\epsilon$, the following equation is used:

$$\epsilon = \epsilon_0 / w_p$$

The equation accounts for the confidence weight $w_p$ in the denominator, so that points with high confidence move more slowly, with a smaller step size $\epsilon$. In an illustrative example, $\epsilon_0 = 0.01$ mm, considering an optimization in 3D space using a global coordinate system in millimeters. In some implementations, the optimization may be skipped altogether for points with $w_p > 100$, or some other threshold value.

In certain implementations of the presently disclosed mixed three dimensional scene reconstruction from plural surface models, a system in provided to acquire the image data and/or to carry out the processing consistent with the principles described herein. This description is offered as exemplary only, and not limiting. Other systems and/or hardware components, in whole or in part, achieving the functions described herein may be used without departing from the scope of Applicant's present disclosure.

Figure 4:
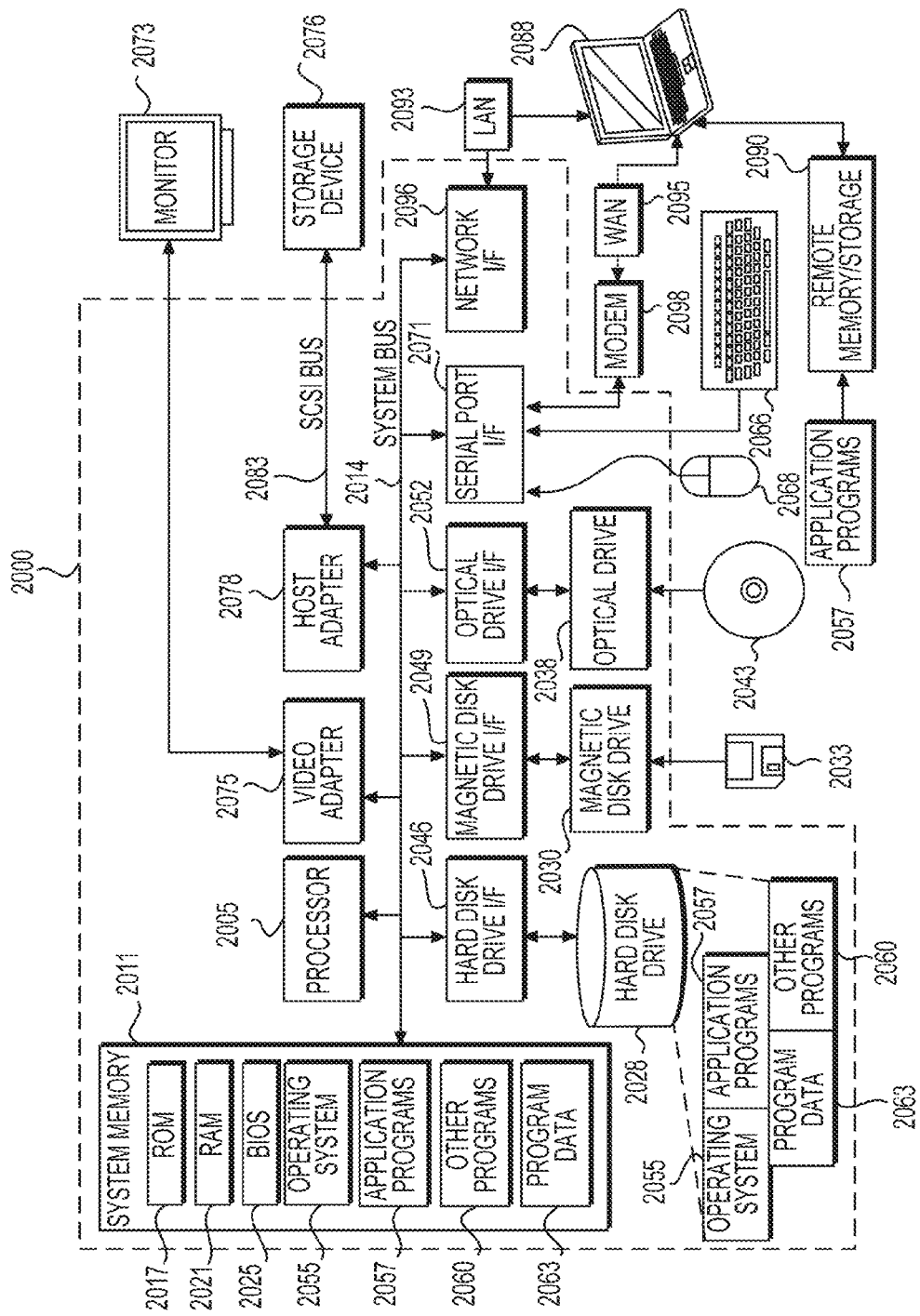
FIG. 4 is a simplified block diagram of an illustrative computer system such as a personal computer (PC) or server that may be used in part to implement the present mixed 3D scene reconstruction from plural surface models.

FIG. 4 is a simplified block diagram of an illustrative computer system 2000 such as a PC, client device, or server with which the present mixed 3D scene reconstruction from plural surface models may be implemented. Computer system 2000 includes a processing unit 2005, a system memory 2011, and a system bus 2014 that couples various system components including the system memory 2011 to the processing unit 2005. The system bus 2014 may be any of several types of bus structures including a memory bus or memory controller, a peripheral bus, and a local bus using any of a variety of bus architectures. The system memory 2011 includes read only memory ("ROM") 2017 and random access memory ("RAM") 2021. A basic input/output system ("BIOS") 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer readable storage media provide non-volatile storage of computer readable instructions, data structures, program modules, and other data for the computer system 2000. Although this illustrative example shows a hard disk, a removable magnetic disk 2033, and a removable optical disk 2043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present mixed three dimensional scene reconstruction from plural surface models. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 2005 through a serial port interface 2071 that is coupled to the system bus 2014, but may be connected by other interfaces, such as a parallel port, game port, or USB. A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 4 also includes a host adapter 2078, a Small Computer System Interface ("SCSI") bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 4. The logical connections depicted in FIG. 4 include a local area network ("LAN") 2093 and a wide area network ("WAN") 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 4 are illustrative and other means of establishing a communications link between the computers may be used depending on the specific requirements of an application of the present mixed three dimensional scene reconstruction from plural surface models. It may be desirable and/or advantageous to enable other types of computing platforms other than the computer system 2000 to implement the present mixed three dimensional scene reconstruction from plural surface models in some applications.

Figure 5:
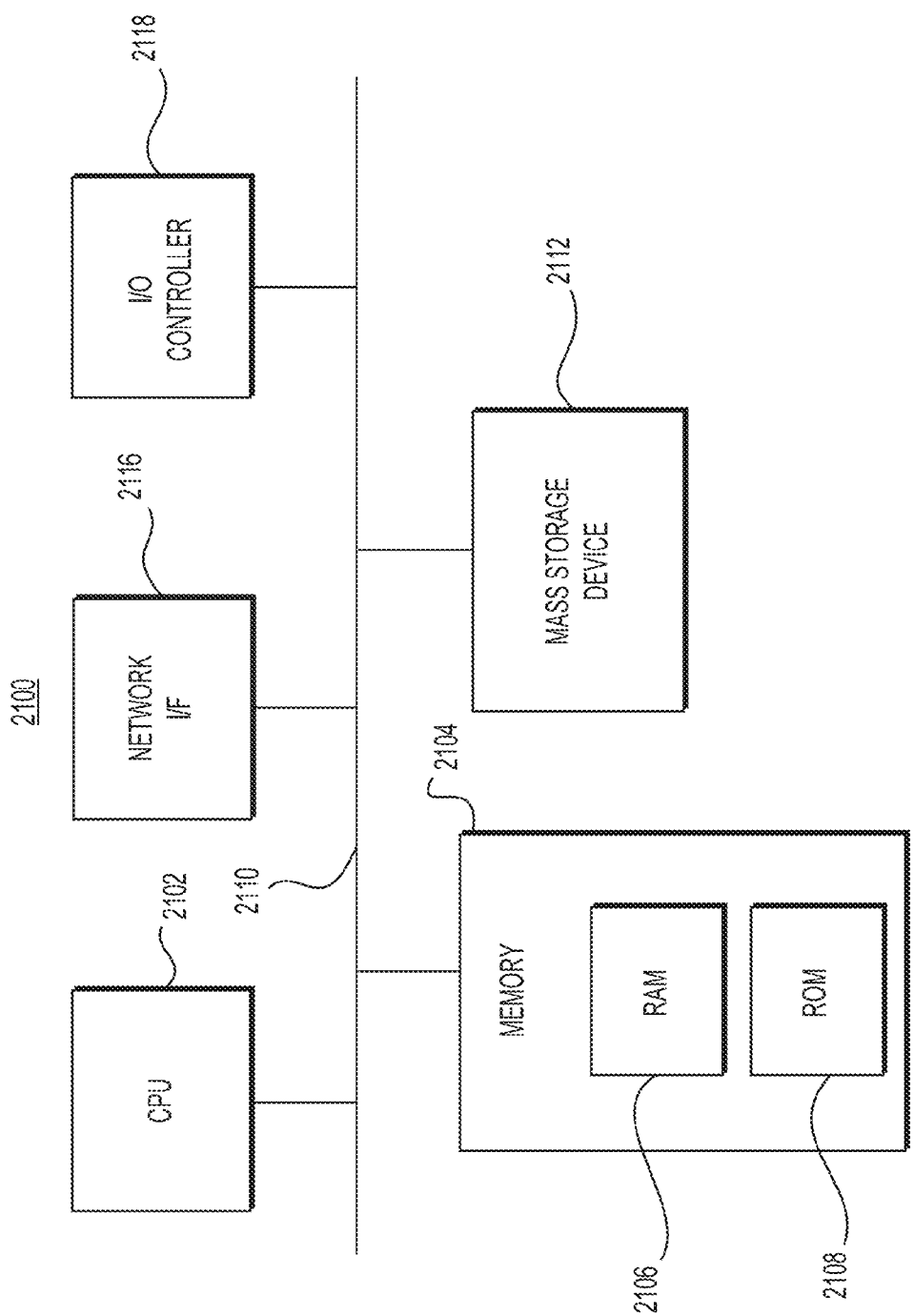
FIG. 5 shows a block diagram of an illustrative computing platform that may be used in part to implement the present mixed 3D scene reconstruction from plural surface models.

FIG. 5 shows an illustrative architecture 2100 for a device capable of executing the various components described herein for providing the present mixed three dimensional scene reconstruction from plural surface models. Thus, the architecture 2100 illustrated in FIG. 5 shows an architecture that may be adapted for a server computer, mobile phone, a PDA, a smartphone, a desktop computer, a netbook computer, a tablet computer, GPS device, multimedia gaming console, and/or a laptop computer. The architecture 2100 may be utilized to execute any aspect of the components presented herein.

The architecture 2100 illustrated in FIG. 5 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100. Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 5). Similarly, the input/output controller 2118 may provide output to a display screen, a printer, or other type of output device (also not shown in FIG. 5).

It may be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2100 in order to store and execute the software components presented herein. It may also be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 5, may include other components that are not explicitly shown in FIG. 5, or may utilize an architecture completely different from that shown in FIG. 5.

Figure 6:
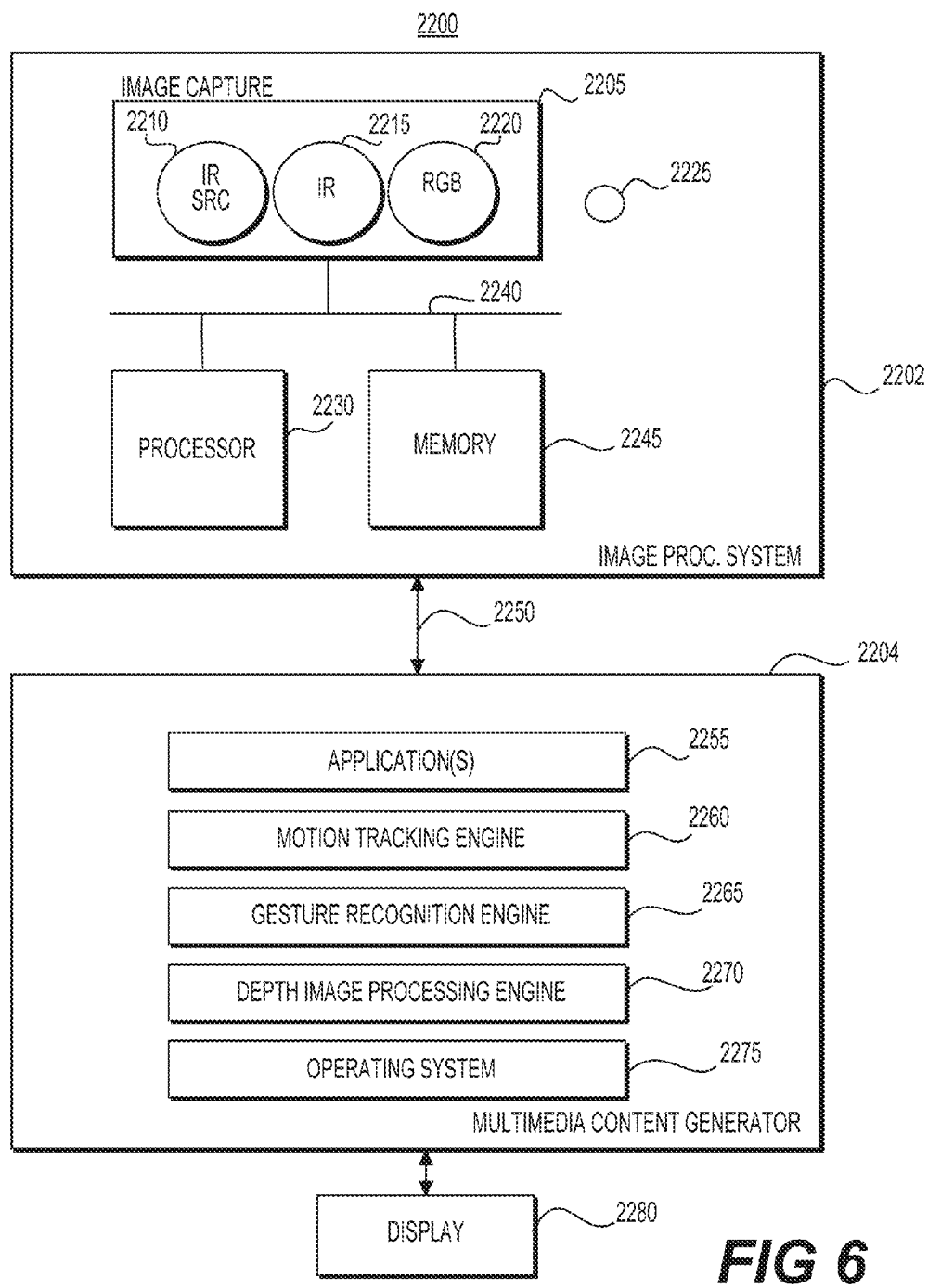
FIG. 6 shows a functional block diagram of an illustrative camera system that may be used in part to implement the present mixed 3D scene reconstruction from plural surface models.

FIG. 6 shows illustrative functional components of an image processing system 2202 and multimedia content generator 2204 that may be used to recognize human and anthropomorphic images in a three-dimensional scene. The image processing system 2202 may be configured to capture video with depth information including a depth image that may include depth values via any suitable technique including, for example, time-of-flight, structured light, stereo image, or the like. In some implementations, the image processing system 2202 may organize the calculated depth information into "Z layers," or layers that may be perpendicular to a Z-axis extending from the depth camera along its line of sight.

As shown in FIG. 6, the image processing system 2202 includes an image capture component 2205. The image capture component 2205 may be configured to operate as a depth camera that may capture a depth image of a scene. The depth image may include a two-dimensional ("2D") pixel area of the captured scene where each pixel in the 2D pixel area may represent a depth value such as a distance in, for example, centimeters, millimeters, or the like of an object in the captured scene from the camera. In this example, the image capture component 2205 includes an IR light component 2210, an IR camera 2215, and a visible light RGB camera 2220 that may be configured in an array, as shown, or in an alternative geometry.

Various techniques may be utilized to capture depth video frames. For example, in time-of-flight analysis, the IR light component 2210 of the image processing system 2202 may emit an infrared light onto the capture area and may then detect the backscattered light from the surface of one or more targets and objects in the capture area using, for example, the IR camera 2215 and/or the RGB camera 2220. In some embodiments, pulsed infrared light may be used such that the time between an outgoing light pulse and a corresponding incoming light pulse may be measured and used to determine a physical distance from the image processing system 2202 to a particular location on the targets or objects in the capture area. Additionally, the phase of the outgoing light wave may be compared to the phase of the incoming light wave to determine a phase shift. The phase shift may then be used to determine a physical distance from the camera system to a particular location on the targets or objects. Time-of-flight analysis may be used to indirectly determine a physical distance from the image processing system 2202 to a particular location on the targets or objects by analyzing the intensity of the reflected beam of light over time via various techniques including, for example, shuttered light pulse imaging.

In other implementations, the image processing system 2202 may use structured light to capture depth information. In such an analysis, patterned light (i.e., light displayed as a known pattern such as a grid pattern or a stripe pattern) may be projected onto the capture area via, for example, the IR light component 2210. Upon striking the surface of one or more targets or objects in the capture area, the pattern may become deformed in response. Such a deformation of the pattern may be captured by, for example, the IR camera 2215 and/or the RGB camera 2220 and may then be analyzed to determine a physical distance from the camera system to a particular location on the targets or objects.

The image processing system 2202 may utilize two or more physically separated cameras that may view a capture area from different angles, to obtain visual stereo data that may be resolved to generate depth information. Other types of depth image arrangements using single or multiple cameras can also be used to create a depth image. The image processing system 2202 may further include a microphone 2225. The microphone 2225 may include a transducer or sensor that may receive and convert sound into an electrical signal. The microphone 2225 may be used to reduce feedback between the image processing system 2202 and the multimedia content generator 2204 in a target recognition, analysis, and tracking system 2200. Additionally, the microphone 2225 may be used to receive audio signals that may also be provided by the viewer 10 to control applications such as game applications, non-game applications, or the like that may be executed by the multimedia content generator 2204.

The image processing system 2202 may further include a processor 2230 that may be in operative communication with the image capture component 2205 over a bus 2240. The processor 2230 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The image processing system 2202 may further include a memory component 2245 that may store the instructions that may be executed by the processor 2230, images or frames of images captured by the cameras, user profiles or any other suitable information, images, or the like. According to one example, the memory component 2245 may include RAM, ROM, cache, Flash memory, a hard disk, or any other suitable storage component. As shown in FIG. 6, the memory component 2245 may be a separate component in communication with the image capture component 2205 and the processor 2230. Alternatively, the memory component 2245 may be integrated into the processor 2230 and/or the image capture component 2205. In one embodiment, some or all of the components of the image processing system 2202 are located in a single housing.

The image processing system 2202 and particularly image capture component 2205 described above are with reference to the acquisition of images taken from a physical environment. According to another embodiment, the image capture component 2205 and/or image processing system 2202 are configured to receive a computational description of a three-dimensional scene to be rendered, and/or image data describing images of that three-dimensional scene. In that case, the computational description includes, and/or the derived image data can be made to include a priori depth information. For each image of the three-dimensional scene, the underlying depth information can be conveniently organized as a depth image for further processing as described herein.

The image processing system 2202 operatively communicates with the multimedia content generator 2204 over a communication link 2250. The communication link 2250 may be a wired connection including, for example, a USB (Universal Serial Bus) connection, a Firewire connection, an Ethernet cable connection, or the like and/or a wireless connection such as a wireless IEEE 802.11 connection. The multimedia content generator 2204 can provide a clock to the image processing system 2202 that may be used to determine when to capture, for example, a scene via the communication link 2250. The image processing system 2202 may provide the depth information and images captured by, for example, the IR camera 2215 and/or the RGB camera 2220, including a skeletal model and/or facial tracking model that may be generated by the image processing system 2202, to the multimedia content generator 2204 via the communication link 2250. The multimedia content generator 2204 may then use the skeletal and/or facial tracking models, depth information, and captured images to, for example, create a virtual screen, adapt the user interface, and control apps/games 2255. According to a further embodiment, the provision of a computational description, image data, and/or a depth image can be made directly to the multimedia content generator 2204, obviating the need for the image processing system 2202, or at least some of its elements.

A motion tracking engine 2260 uses the skeletal and/or facial tracking models and the depth information to provide a control output to one or more apps/games 2255 running on the multimedia content generator 2204 to which the image processing system 2202 is coupled. The information may also be used by a gesture recognition engine 2265, depth image processing engine 2270, and/or operating system 2275.

The depth image processing engine 2270 uses the depth images to track motion of objects, such as the user and other objects. The depth image processing engine 2270 will typically report to the operating system 2275 an identification of each object detected and the location of the object for each frame. The operating system 2275 can use that information to update the position or movement of an avatar, for example, or other images shown on a display, for example display 2280, or to perform an action on the user interface.

The gesture recognition engine 2265 may utilize a gestures library (not shown) that can include a collection of gesture filters, each comprising information concerning a gesture that may be performed, for example, by a skeletal model (as the user moves). The gesture recognition engine 2265 may compare the frames captured by the image processing system 2202 in the form of the skeletal model and movements associated with it to the gesture filters in the gesture library to identify when a user (as represented by the skeletal model) has performed one or more gestures. Those gestures may be associated with various controls of an application and/or system. Thus, the multimedia content generator 2204 may employ the gestures library to interpret movements of the skeletal model and to control an operating system or an application running on the multimedia console based on the movements.

In some implementations, various aspects of the functionalities provided by the apps/games 2255, motion tracking engine 2260, gesture recognition engine 2265, depth image processing engine 2270, and/or operating system 2275 may be directly implemented on the image processing system 2202 itself. In another embodiment, the functions and or features described above with respect to the multimedia content generator 2204 may be performed and/or incorporated into a multimedia gaming console 2300, described above and further below. For example the image processing system 2202 may provide image information to the multimedia gaming console 2300 to implement a natural user interface, among other features and functions.

Figure 7:
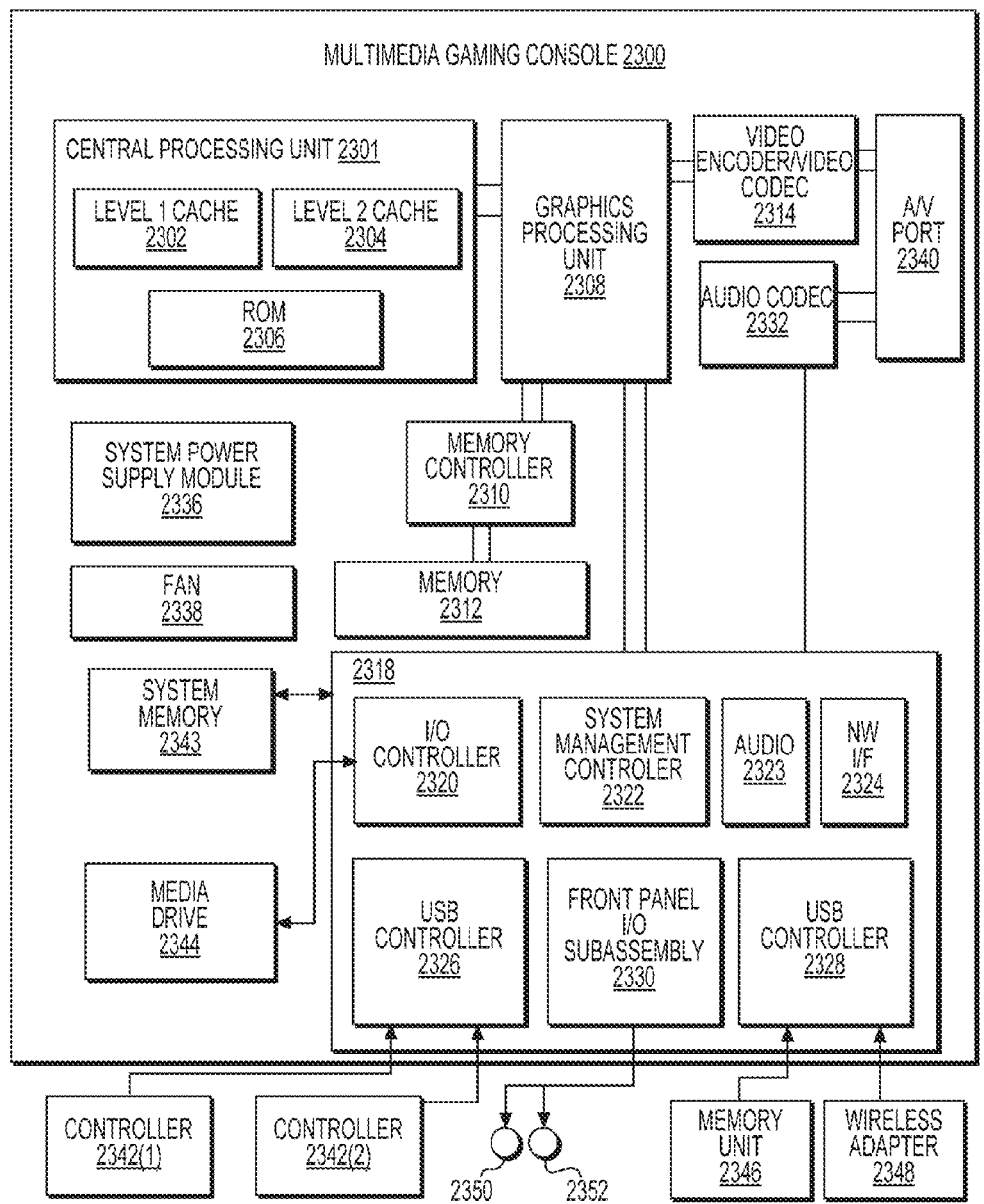
FIG. 7 shows a functional block diagram of an illustrative multimedia console that may be used in part to implement the present mixed 3D scene reconstruction from plural surface models.

FIG. 7 is an illustrative functional block diagram of the multimedia gaming console 2300. The multimedia gaming console 2300 has a central processing unit (CPU) 2301 having a level 1 cache 2302, a level 2 cache 2304, and a Flash ROM (Read Only Memory) 2306. The level 1 cache 2302 and the level 2 cache 2304 temporarily store data and hence reduce the number of memory access cycles, thereby improving processing speed and throughput. The CPU 2301 may be configured with more than one core, and thus, additional level 1 and level 2 caches 2302 and 2304. The Flash ROM 2306 may store executable code that is loaded during an initial phase of a boot process when the multimedia gaming console 2300 is powered ON.

A graphics processing unit (GPU) 2308 and a video encoder/video codec (coder/decoder) 2314 form a video processing pipeline for high speed and high resolution graphics processing. Data is carried from the GPU 2308 to the video encoder/video codec 2314 via a bus. The video processing pipeline outputs data to an AN (audio/video) port 2340 for transmission to a television or other display. A memory controller 2310 is connected to the GPU 2308 to facilitate processor access to various types of memory 2312, such as, but not limited to, a RAM.

The multimedia gaming console 2300 includes an I/O controller 2320, a system management controller 2322, an audio processing unit 2323, a network interface controller 2324, a first USB (Universal Serial Bus) host controller 2326, a second USB controller 2328, and a front panel I/O subassembly 2330 that are preferably implemented on a module 2318. The USB controllers 2326 and 2328 serve as hosts for peripheral controllers 2342(1) and 2342(2), a wireless adapter 2348, and an external memory device 2346 (e.g., Flash memory, external CD/DVD ROM drive, removable media, etc.). The network interface controller 2324 and/or wireless adapter 2348 provide access to a network (e.g., the Internet, home network, etc.) and may be any of a wide variety of various wired or wireless adapter components including an Ethernet card, a modem, a Bluetooth module, a cable modem, or the like.

System memory 2343 is provided to store application data that is loaded during the boot process. A media drive 2344 is provided and may comprise a DVD/CD drive, hard drive, or other removable media drive, etc. The media drive 2344 may be internal or external to the multimedia gaming console 2300. Application data may be accessed via the media drive 2344 for execution, playback, etc. by the multimedia gaming console 2300. The media drive 2344 is connected to the I/O controller 2320 via a bus, such as a Serial ATA bus or other high speed connection (e.g., IEEE 1394).

The system management controller 2322 provides a variety of service functions related to assuring availability of the multimedia gaming console 2300. The audio processing unit 2323 and an audio codec 2332 form a corresponding audio processing pipeline with high fidelity and stereo processing. Audio data is carried between the audio processing unit 2323 and the audio codec 2332 via a communication link. The audio processing pipeline outputs data to the AN port 2340 for reproduction by an external audio player or device having audio capabilities.

The front panel I/O subassembly 2330 supports the functionality of the power button 2350 and the eject button 2352, as well as any LEDs (light emitting diodes) or other indicators exposed on the outer surface of the multimedia gaming console 2300. A system power supply module 2336 provides power to the components of the multimedia gaming console 2300. A fan 2338 cools the circuitry within the multimedia gaming console 2300.

The CPU 2301, GPU 2308, memory controller 2310, and various other components within the multimedia gaming console 2300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia gaming console 2300 is powered ON, application data may be loaded from the system memory 2343 into memory 2312 and/or caches 2302 and 2304 and executed on the CPU 2301. The application may present a graphical user interface that provides a consistent user experience when navigating to different media types available on the multimedia gaming console 2300. In operation, applications and/or other media contained within the media drive 2344 may be launched or played from the media drive 2344 to provide additional functionalities to the multimedia gaming console 2300.

The multimedia gaming console 2300 may be operated as a standalone system by simply connecting the system to a television or other display. In this standalone mode, the multimedia gaming console 2300 allows one or more users to interact with the system, watch movies, or listen to music. However, with the integration of broadband connectivity made available through the network interface controller 2324 or the wireless adapter 2348, the multimedia gaming console 2300 may further be operated as a participant in a larger network community.

When the multimedia gaming console 2300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will typically consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia gaming console 2300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2342(1) and 2342(2)) are shared by gaming applications and system applications. The input devices are not reserved resources, but are to be switched between system applications and the gaming application such that each will typically have a focus of the device. The application manager preferably controls the switching of input stream, without knowledge of the gaming application's knowledge and a driver maintains state information regarding focus switches.

Various exemplary embodiments of the present mixed 3D scene reconstruction from plural surface models are now presented by way of illustration and not as an exhaustive list of all embodiments. An example includes a method of modeling a three-dimensional object from plural image data sources, the method comprising: providing a first point cloud including a first plurality of points defined in space, the first plurality of points being derived from a first one or more images of the object, the first one or more images being of a first image type, each point in the first plurality representing a location on the surface of the three-dimensional object, and each point in the first plurality having a first confidence value on a first confidence scale; providing a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale; merging the first plurality and the second plurality of points into a third merged point cloud, each point in the third merged point cloud representing a location on the surface of the object, including: normalizing one of the first or second confidence scales with the respective second or first confidence scale; and for each location of the object for which a corresponding point exists in both the first point cloud and the second point cloud, selecting the point for inclusion in the merged point cloud from either the first point cloud or the second point cloud having a greater first or second normalized confidence value.

In another example, the method further comprises providing a first point cloud having therein a first plurality of points derived using a multiview stereo (MVS) process. In another example, the method further comprises providing a first point cloud having therein a first plurality of points, each point in the first plurality having a first confidence value being based upon an average texturedness value of the first one or more images. In another example, the method further comprises providing a second point cloud having therein a first plurality of points derived using a visual hull process. In another example, the method further comprises providing a second point cloud having therein a second plurality of points, each point in the second plurality having a second confidence value being based on a depth of the visual hull of the second one or more images. In another example, the method further comprises normalizing one of the first and second confidence scales with the respective second or first confidence scale including using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space. In another example, the method further comprises merging the first plurality and the second plurality of points into a third merged point cloud, each point in the third merged point cloud representing a location on the surface of the object, including selecting the point for inclusion in the merged point cloud from either the first point cloud or the second point cloud in response to the first or second normalized confidence value being greater than a predetermined threshold.

A further example includes a computing device configured for modeling a three-dimensional object from plural image data sources, the computing device comprising: one or more processors; a network interface for supporting communications with the rendering device; and one or more memories storing computer-readable instructions which, when executed by the one or more processors, cause the one or more processors to perform a method for controlling access to data from the remote client device comprising the steps of: provide a first point cloud including a first plurality of points defined in space, the first plurality of points being derived from a first one or more images of the object, the first one or more images being of a first image type, each point in the first plurality representing a location on the surface of the three-dimensional object, and each point in the first plurality having a first confidence value on a first confidence scale; provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale; merge the first plurality and the second plurality of points into a third merged point cloud, each point in the third merged point cloud representing a location on the surface of the object, including: normalizing one of the first and second confidence scales with the respective second or first confidence scale; and for each location of the object for which a corresponding point exists in both the first point cloud and the second point cloud, selecting the point for inclusion in the merged point cloud from either the first point cloud or the second point cloud having a greater first or second normalized confidence value.

In another example, the computing device further comprises the one or more memories storing computer-readable instructions which, when executed by the one or more processors, cause the one or more processors to provide a first point cloud having therein a first plurality of points derived using a multiview stereo (MVS) process. In another example, the computing device further comprises the one or more memories storing computer-readable instructions which, when executed by the one or more processors, cause the one or more processors to provide a first point cloud having therein a first plurality of points, each point in the first plurality having a first confidence value being based upon an average texturedness value of the first one or more images. In another example, the computing device further comprises the one or more memories storing computer-readable instructions which, when executed by the one or more processors, cause the one or more processors to provide a second point cloud having therein a first plurality of points defined in space derived using a visual hull process. In another example, the computing device further comprises the one or more memories storing computer-readable instructions which, when executed by the one or more processors, cause the one or more processors to provide a second point cloud having therein a second plurality of points, each point in the second plurality having a second confidence value being based on a depth of the visual hull of the second one or more images. In another example, the computing device further comprises the one or more memories storing computer-readable instructions which, when executed by the one or more processors, cause the one or more processors to normalize one of the first and second confidence scales with the respective second or first confidence scale including using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space. In another example, the computing device further comprises the one or more memories storing computer-readable instructions which, when executed by the one or more processors, cause the one or more processors to merge the first plurality and the second plurality of points into a third merged point cloud, each point in the third merged point cloud representing a location on the surface of the object, including selecting the point for inclusion in the merged point cloud from either the first point cloud or the second point cloud in response to the first or second normalized confidence value being greater than a predetermined threshold.

A further example includes a system for modeling a three-dimensional object from plural image data sources, the system comprising: first and second image capture devices, the first and second image capture devices each being operative to produce image data representing an image of the three-dimensional object, at least one of the first or second image capture devices further being operative to produce image data representing a silhouette image of the object; and a computing device configured for modeling a three-dimensional object from plural image data sources, the computing device including one or more processors; a network interface for supporting communications with the rendering device; and one or more memories storing computer-readable instructions which, when executed by the one or more processors, cause the one or more processors to perform a method for modeling a three-dimensional object comprising the steps of: provide a first point cloud including a first plurality of points defined in space, the first plurality of points being derived from a first one or more images of the object, the first one or more images being of a first image type, each point in the first plurality representing a location on the surface of the three-dimensional object, and each point in the first plurality having a first confidence value on a first confidence scale; provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale; merge the first plurality and the second plurality of points into a third merged point cloud, each point in the third merged point cloud representing a location on the surface of the object, including: normalizing one of the first and second confidence scales with the respective second or first confidence scale; and for each location of the object for which a corresponding point exists in both the first point cloud and the second point cloud, selecting the point for inclusion in the merged point cloud from either the first point cloud or the second point cloud having a greater first or second normalized confidence value.

In another example, the system further comprises the one or more memories storing computer-readable instructions which, when executed by the one or more processors, cause the one or more processors to provide a first point cloud having therein a first plurality of points derived using a multiview stereo (MVS) process. In another example, the system further comprises the one or more memories storing computer-readable instructions which, when executed by the one or more processors, cause the one or more processors to provide a first point cloud having therein a first plurality of points, each point in the first plurality having a first confidence value being based upon an average texturedness value of the first one or more images. In another example, the system further comprises the one or more memories storing computer-readable instructions which, when executed by the one or more processors, cause the one or more processors to provide a second point cloud having therein a first plurality of points defined in space derived using a visual hull process. In another example, the system further comprises the one or more memories storing computer-readable instructions which, when executed by the one or more processors, cause the one or more processors to provide a second point cloud having therein a second plurality of points, each point in the second plurality having a second confidence value being based on a depth of the visual hull of the second one or more images. In another example, the system further comprises the one or more memories storing computer-readable instructions which, when executed by the one or more processors, cause the one or more processors to normalize one of the first and second confidence scales with the respective second or first confidence scale including using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space.

Based on the foregoing, it may be appreciated that technologies for implementing mixed 3D scene reconstruction from plural surface models have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of modeling a three-dimensional object from plural image data sources, the method comprising:
   providing a first point cloud including a first plurality of points defined in space, the first plurality of points being derived using a multiview stereo (MVS) process from a first one or more images of the object, the first one or more images being of a first image type, each point in the first plurality representing a location on a surface of the three-dimensional object, and each point in the first plurality having a first confidence value on a first confidence scale, the first confidence value being based upon an average texturedness value of the first one or more images;
   providing a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale;
   merging the first plurality and the second plurality of points into a third merged point cloud, each point in the third merged point cloud representing a location on the surface of the object, including:
   normalizing one of the first or second confidence scales with the respective second or first confidence scale; and
   for each location of the object for which a corresponding point exists in both the first point cloud and the second point cloud, selecting the point for inclusion in the merged point cloud from either the first point cloud or the second point cloud having a greater first or second normalized confidence value.

2. The method according to claim 1, further comprising:
   merging the first plurality and the second plurality of points into the third merged point cloud, each point in the third merged point cloud representing a location on the surface of the object, including selecting the point for inclusion in the merged point cloud from either the first point cloud or the second point cloud in response to the first or second normalized confidence value being greater than a predetermined threshold.

3. A computing device configured for modeling a three-dimensional object from plural image data sources, the computing device comprising:
   one or more processors;
   a network interface for supporting communications with the rendering device; and
   one or more memories storing computer-readable instructions which, when executed by the one or more processors, cause the one or more processors to perform a method for controlling access to data from the remote client device comprising the steps of:
   provide a first point cloud including a first plurality of points defined in space, the first plurality of points being derived using a multiview stereo (MVS) process from a first one or more images of the object, the first one or more images being of a first image type, each point in the first plurality representing a location on a surface of the three-dimensional object, and each point in the first plurality having a first confidence value on a first confidence scale, the first confidence value being based upon an average texturedness value of the first one or more images;
   provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale;
   merge the first plurality and the second plurality of points into a third merged point cloud, each point in the third merged point cloud representing a location on the surface of the object, including:
      normalizing one of the first and second confidence scales with the respective second or first confidence scale; and
      for each location of the object for which a corresponding point exists in both the first point cloud and the second point cloud, selecting the point for inclusion in the merged point cloud from either the first point cloud or the second point cloud having a greater first or second normalized confidence value.

4. The computing device according to claim 3, further comprising:
   the one or more memories storing computer-readable instructions which, when executed by the one or more processors, cause the one or more processors to merge the first plurality and the second plurality of points into the third merged point cloud, each point in the third merged point cloud representing a location on the surface of the object, including selecting the point for inclusion in the merged point cloud from either the first point cloud or the second point cloud in response to the first or second normalized confidence value being greater than a predetermined threshold.

5. A system for modeling a three-dimensional object from plural image data sources, the system comprising:
   first and second image capture devices, the first and second image capture devices each being operative to produce image data representing an image of the three-dimensional object, at least one of the first or second image capture devices further being operative to produce image data representing a silhouette image of the object; and
   a computing device configured for modeling a three-dimensional object from plural image data sources, the computing device including
   one or more processors;
   a network interface for supporting communications with the rendering device; and
   one or more memories storing computer-readable instructions which, when executed by the one or more processors, cause the one or more processors to perform a method for modeling a three-dimensional object comprising the steps of:
   provide a first point cloud including a first plurality of points defined in space, the first plurality of points being derived using a multiview stereo (MVS) process from a first one or more images of the object, the first one or more images being of a first image type, each point in the first plurality representing a location on a surface of the three-dimensional object, and each point in the first plurality having a first confidence value on a first confidence scale, the first confidence value being based upon an average texturedness value of the first one or more images;
   provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale;
   merge the first plurality and the second plurality of points into a third merged point cloud, each point in the third merged point cloud representing a location on the surface of the object, including:
      normalizing one of the first and second confidence scales with the respective second or first confidence scale; and
      for each location of the object for which a corresponding point exists in both the first point cloud and the second point cloud, selecting the point for inclusion in the merged point cloud from either the first point cloud or the second point cloud having a greater first or second normalized confidence value.

6. A method of modeling a three-dimensional object from plural image data sources, the method comprising:
   providing a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale;
   providing a second point cloud including a second plurality of points defined in space, the second plurality of points being derived using a visual hull process from a second one or more images of the object, the second one or more images being of a second image type, each point in the second plurality representing a location on the surface of the three-dimensional object, and each point in the second plurality having a second confidence value on a second confidence scale, the second confidence value being based on a depth of the visual hull of the second one or more images;

merging the first plurality and the second plurality of points into a third merged point cloud, each point in the third merged point cloud representing a location on the surface of the object, including:

normalizing one of the first or second confidence scales with the respective second or first confidence scale; and for each location of the object for which a corresponding point exists in both the first point cloud and the second point cloud, selecting the point for inclusion in the merged point cloud from either the first point cloud or the second point cloud having a greater first or second normalized confidence value.

7. A method of modeling a three-dimensional object from plural image data sources, the method comprising:

providing a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale;

providing a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale;

merging the first plurality and the second plurality of points into a third merged point cloud, each point in the third merged point cloud representing a location on the surface of the object, including:

normalizing one of the first or second confidence scales with the respective second or first confidence scale, for each location of the object for which a corresponding point exists in both the first point cloud and the second point cloud, selecting the point for inclusion in the merged point cloud from either the first point cloud or the second point cloud having a greater first or second normalized confidence value, and wherein the normalizing includes using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space.

8. A computing device configured for modeling a three-dimensional object from plural image data sources, the computing device comprising:

one or more processors;

a network interface for supporting communications with the rendering device; and one or more memories storing computer-readable instructions which, when executed by the one or more processors, cause the one or more processors to perform a method for controlling access to data from the remote client device comprising the steps of:

provide a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale;

provide a second point cloud including a second plurality of points defined in space, the second plurality of points being derived using a visual hull process from a second one or more images of the object, the second one or more images being of a second image type, each point in the second plurality representing a location on the surface of the three-dimensional object, and each point in the second plurality having a second confidence value on a second confidence scale, the second confidence value being based on a depth of the visual hull of the second one or more images;

merge the first plurality and the second plurality of points into a third merged point cloud, each point in the third merged point cloud representing a location on the surface of the object, including:

normalizing one of the first and second confidence scales with the respective second or first confidence scale; and for each location of the object for which a corresponding point exists in both the first point cloud and the second point cloud, selecting the point for inclusion in the merged point cloud from either the first point cloud or the second point cloud having a greater first or second normalized confidence value.

9. A computing device configured for modeling a three-dimensional object from plural image data sources, the computing device comprising:

one or more processors;

a network interface for supporting communications with the rendering device; and one or more memories storing computer-readable instructions which, when executed by the one or more processors, cause the one or more processors to perform a method for controlling access to data from the remote client device comprising the steps of:

provide a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale;

provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale;

merge the first plurality and the second plurality of points into a third merged point cloud, each point in the third merged point cloud representing a location on the surface of the object, including:

normalizing one of the first and second confidence scales with the respective second or first confidence scale, for each location of the object for which a corresponding point exists in both the first point cloud and the second point cloud, selecting the point for inclusion in the merged point cloud from either the first point cloud or the second point cloud having a greater first or second normalized confidence value, and wherein the normalizing includes using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space.

10. A system for modeling a three-dimensional object from plural image data sources, the system comprising:

first and second image capture devices, the first and second image capture devices each being operative to produce image data representing an image of the three-dimensional object, at least one of the first or second image capture devices further being operative to produce image data representing a silhouette image of the object; and a computing device configured for modeling a three-dimensional object from plural image data sources, the computing device including one or more processors;

a network interface for supporting communications with the rendering device; and one or more memories storing computer-readable instructions which, when executed by the one or more processors, cause the one or more processors to perform a method for modeling a three-dimensional object comprising the steps of:

provide a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale;

provide a second point cloud including a second plurality of points defined in space, the second plurality of points being derived using a visual hull process from a second one or more images of the object, the second one or more images being of a second image type, each point in the second plurality representing a location on the surface of the three-dimensional object, and each point in the second plurality having a second confidence value on a second confidence scale, the second confidence value being based on a depth of the visual hull of the second one or more images, and merge the first plurality and the second plurality of points into a third merged point cloud, each point in the third merged point cloud representing a location on the surface of the object, including:

normalizing one of the first and second confidence scales with the respective second or first confidence scale, and for each location of the object for which a corresponding point exists in both the first point cloud and the second point cloud, selecting the point for inclusion in the merged point cloud from either the first point cloud or the second point cloud having a greater first or second normalized confidence value.

11. A system for modeling a three-dimensional object from plural image data sources, the system comprising:

first and second image capture devices, the first and second image capture devices each being operative to produce image data representing an image of the three-dimensional object, at least one of the first or second image capture devices further being operative to produce image data representing a silhouette image of the object; and a computing device configured for modeling a three-dimensional object from plural image data sources, the computing device including one or more processors, a network interface for supporting communications with the rendering device; and one or more memories storing computer-readable instructions which, when executed by the one or more processors, cause the one or more processors to perform a method for modeling a three-dimensional object comprising the steps of:

provide a first point cloud including a first plurality of points defined in space, the first plurality of points being derived from a first one or more images of the object, the first one or more images being of a first image type, each point in the first plurality representing a location on a surface of the three-dimensional object, and each point in the first plurality having a first confidence value on a first confidence scale, provide a second point cloud including a second plurality of points defined in space, the second plurality of points being derived from a second one or more images of the object, the second one or more images being of a second image type, each point in the second plurality representing a location on the surface of the three-dimensional object, and each point in the second plurality having a second confidence value on a second confidence scale, merge the first plurality and the second plurality of points into a third merged point cloud, each point in the third merged point cloud representing a location on the surface of the object, including:

normalizing one of the first and second confidence scales with the respective second or first confidence scale, for each location of the object for which a corresponding point exists in both the first point cloud and the second point cloud, selecting the point for inclusion in the merged point cloud from either the first point cloud or the second point cloud having a greater first or second normalized confidence value, and wherein the normalizing includes using a plurality of training objects of progressively varying dimensions and varying texture, each of the plurality of training objects having a preferred imaging technique associated therewith, to train a binary classifier to select a point from the first or second pluralities of points corresponding to the imaging technique used to derive the first or second plurality of points, based upon the texture or dimensions of the object for any location on the object in space.

* * * * *